F. PETRI.
Speed Indicator and Recorder.

Figure 1:
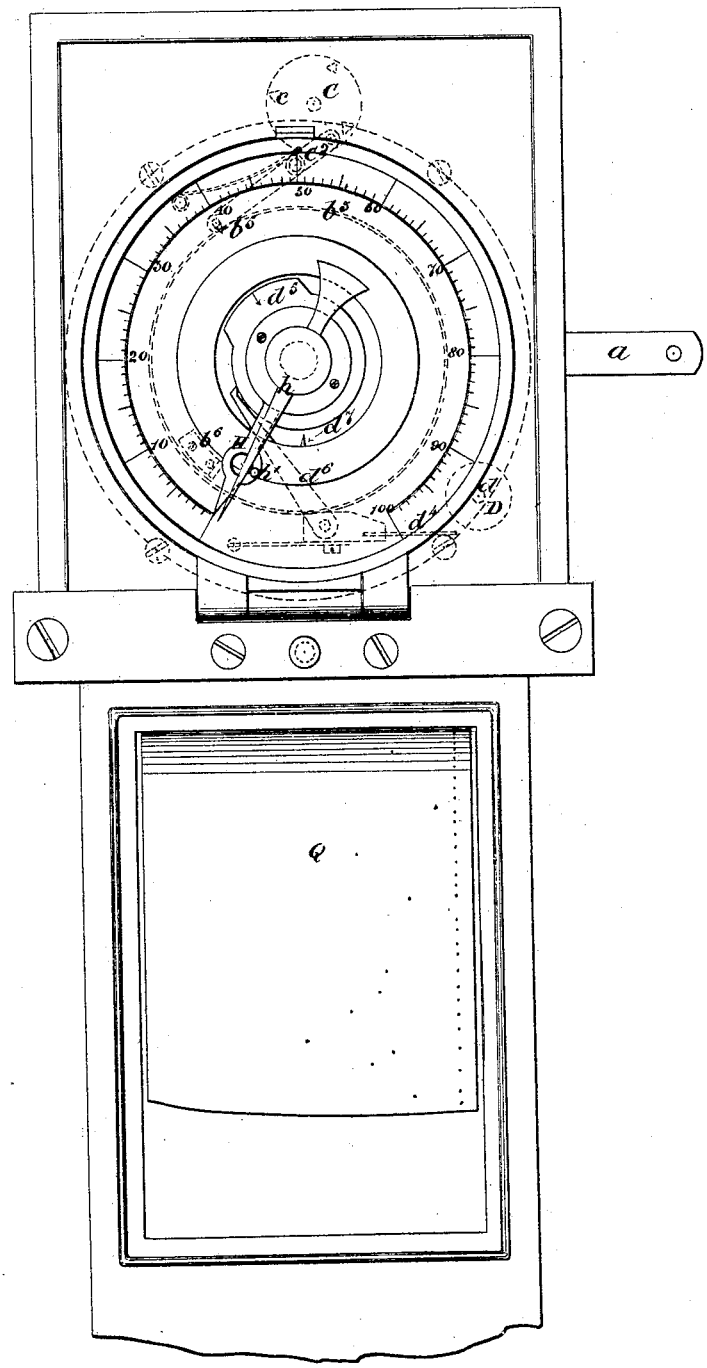

No. 229,456.  Fig. 1.  Patented June 29, 1880.

4 Sheets—Sheet 2.

F. PETRI.
Speed Indicator and Recorder.

No. 229,456. Patented June 29, 1880.

4 Sheets—Sheet 3.

F. PETRI.
Speed Indicator and Recorder.

No. 229,456. Patented June 29, 1880.

4 Sheets—Sheet 4.

F. PETRI.
Speed Indicator and Recorder.

No. 229,456.   Patented June 29, 1880.

Witnesses:
T. J. Pickett.
W. G. Duckett.

Inventor:
Friederich Petri
Per Jno. S. Pickett
Attorney.

N. PETERS, PHOTO-LITHOGRAPHER, WASHINGTON, D. C.

UNITED STATES PATENT OFFICE.

FRIEDRICH PETRI, OF MUNICH, BAVARIA.

SPEED INDICATOR AND RECORDER.

SPECIFICATION forming part of Letters Patent No. 229,456, dated June 29, 1880.

Application filed November 13, 1879.

*To all whom it may concern:*

Be it known that I, FRIEDRICH PETRI, of the city of Munich, in the kingdom of Bavaria, have invented a new and useful Apparatus for Indicating and Recording the Speed of Locomotives, Trains, and other Vehicles, and Steam and other Engines and Machinery, of which the following is a specification.

The apparatus which forms the subject of my invention measures the speed at which a locomotive or other vehicle travels, or at which a steam-engine or other machine works, and indicates the said speed on a dial, showing by the position of an index-hand resting for a certain time, such as fifteen seconds, the speed during the preceding interval of like duration. The apparatus also records the indications of speed by prick-marks on a moving strip of paper, shows by a hand under lock the maximum speed attained during the period of working, and gives an alarm by sounding a bell when a certain predetermined speed, to which the alarm can be set, is attained or exceeded.

The principle on which the measurement of speed is effected by the apparatus may be thus explained: An index or hand is moved, step by step, so as to advance over a division of the dial for each stroke of an engine or for each revolution of a shaft or of a running wheel of known circumference, and this is continued during a certain time, such as fifteen seconds, determined by clock-work, which forms part of the apparatus. The index, having thus for a time been moved, remains for a time (which may also be fifteen seconds) at rest, pointing to the division which it had reached, and so showing the speed with which its movement had been effected. The index then recoils to zero, and is again advanced to show the speed of movement during the next interval, and so on successively.

For recording the speeds on a strip of paper, a pricking-point is moved by gearing connected to the speed-index across the strip, and at the time when the index stops this point is struck by a hammer, so as to make a prick-mark on the paper at a distance from its margin which is proportional to the speed. The pricker then recoils to the margin of the paper, and while it rests there, clear of the paper, the strip is advanced a certain distance and rests. Again the pricker is moved across the paper and struck, and so on, successively. The paper shows, by the positions of the prick-marks on it laterally, the speeds attained during the successive intervals of time, which are indicated by the positions of the prick-marks longitudinally, these intervals corresponding with the distances which the paper is advanced every time it is moved.

For showing the maximum speed attained a second index-hand is advanced by the speed-index, but does not recoil with it. It therefore remains in the farthest advanced position attained by the speed-index, and so shows the highest speed attained during the period of working. As the maximum-index cannot be shifted from its position without opening the dial-facing, which is locked, it remains as a record of the maximum speed until it is set back to zero by the official who has possession of the key.

For the purpose of giving an alarm when a certain speed has been attained, a disk on the spindle of the speed-index may be set, like the alarm-disk of a clock, to the desired speed. When this disk, moving with the speed-index, comes to the position corresponding to the said speed, it brings into action striking-gear, whereby a bell is sounded, giving notice that the predetermined speed is attained or exceeded.

In order to avoid the necessity for winding up the clock-work of the apparatus, the clock-work spring is continually wound up, step by step, by the same movement as that which works the index. When the spring is fully wound, as determined by stop-gear, the winding-gear is automatically thrown out of action, and it returns into action automatically when the spring requires winding afresh.

Having thus stated generally the nature and objects of my invention, I will proceed to describe the apparatus for carrying it into practical effect.

Figure 2:
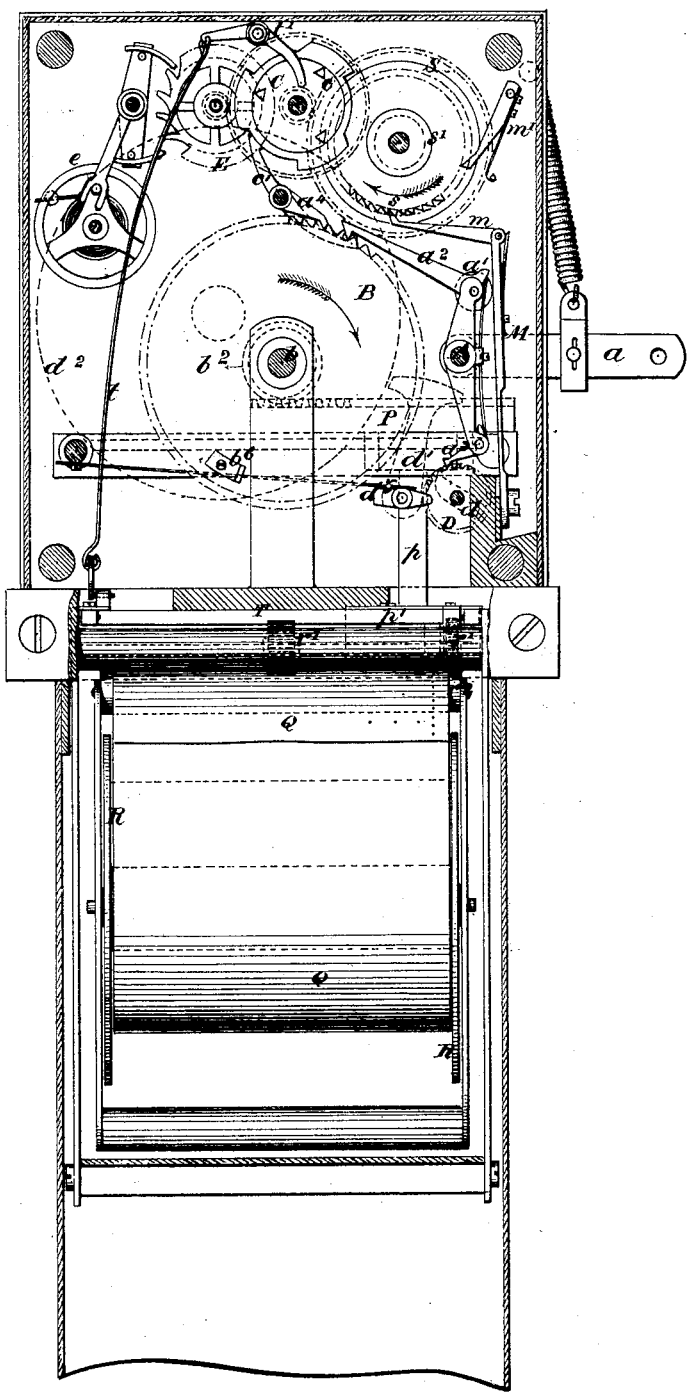
Figure 3:
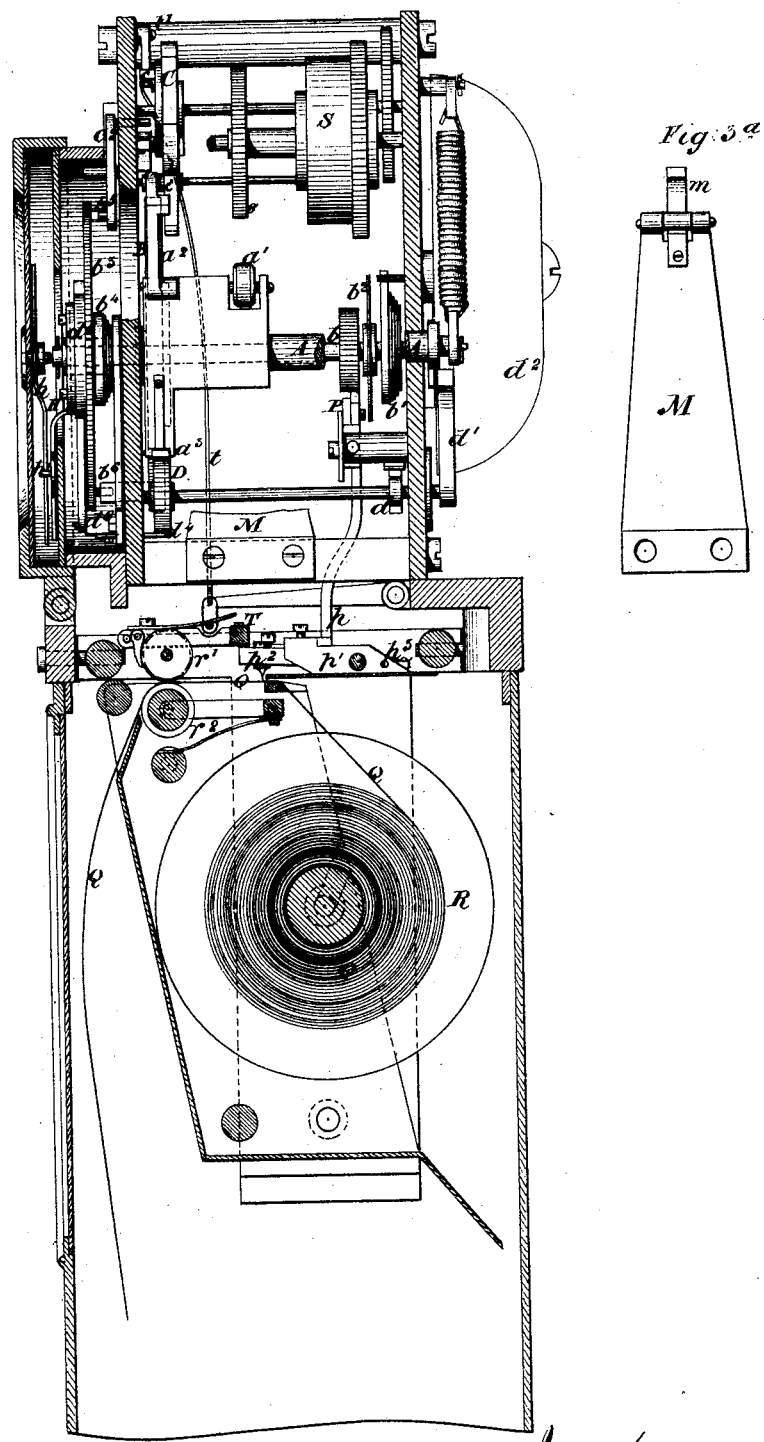
Figure 4:
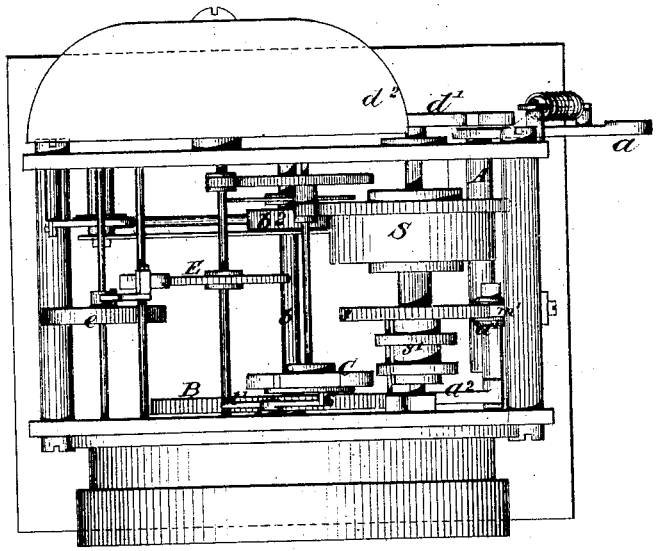
Figure 5:
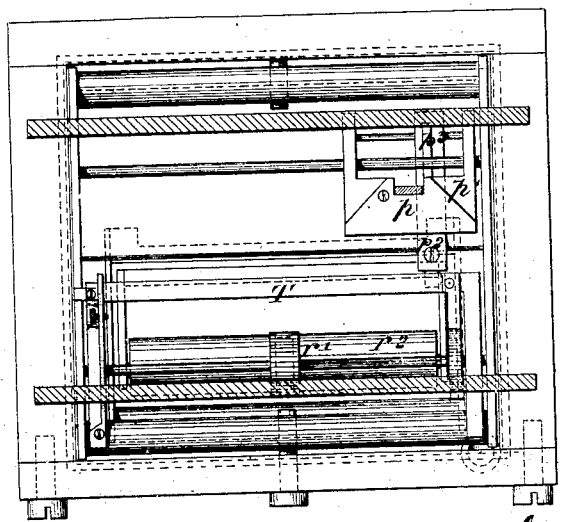

Referring to the accompanying drawings, Figure 1 is a front view of the apparatus. Fig. 2 is a vertical section taken immediately behind the front, so as to show the internal mechanism. Fig. 3 is a side view, the casing being supposed to be removed to show the interior. Fig. 4 is a plan of the top with casing removed. Fig. 5 is a plan of the lower part, where the paper is pricked.

On a rocking spindle, A, is fixed a spring lever-arm, $a$, which is caused to reciprocate by any suitable connection, such as a rod or wire, from a reciprocating part of the engine or machine whose speed is to be indicated, or from a crank-pin or eccentric on a revolving shaft or axle of a vehicle. On the spindle A is fixed a two-armed lever, the upper arm of which carries a roller, $a'$, and a spring-pawl, $a^2$, the lower arm having a spring-pawl, $a^3$. The roller $a'$ bears against a strong spring, M, which is shown broken off in Fig. 3 to let the parts behind it be seen, but is shown in full at Fig. $3^a$. This spring carries a spring-pawl, $m$, which engages with the teeth of a ratchet-wheel, $s$, fixed on a sleeve of a spring-barrel, S. Every time the roller $a'$ moves to the right it bends the spring M, causing the pawl $m$ to slip teeth of the wheel $s$. When the roller $a'$ returns to the left the spring M follows it, and its pawl $m$ gives a partial turn to the wheel $s$, so partly winding up the spring in the barrel S. A pawl, $m'$, prevents the wheel $s$ from turning backward.

On the spindle of the spring S there are several loose collars, $s'$, (shown in Fig. 4, but omitted in Fig. 3, that the work behind them may be seen.) Each of these loose collars has a pin on it engaging with a stud or projection on the next collar in order, and the last with a stud on the spindle of the spring. These collars permit the wheel $s$ to make several revolutions; but when the pins of all the collars are brought to bear against the studs the wheel $s$ becomes stopped, arresting the pawl $m$, so that the spring M does not make its forward stroke until, by the unwinding of the spring in S, the collars $s'$ are again freed to permit the winding-up movement. The spring in S, through a simple train of gearing, moves the escapement-wheel E, which works the escapement and balance $e$, adjusted to time.

On the intermediate spindle of the clockwork gear is fixed a cam-disk, C, with studs $c$ projecting from it, to operate as will presently be described.

The pawl $a^2$ engages with teeth of a ratchet-wheel, B, causing it at every stroke of the lever $a$ to advance one tooth. Its backward movement is prevented by a pawl, $a^4$. The wheel B is fixed on its spindle $b$, and on the same spindle is fixed a toothed pinion, $b^2$, and a volute spring, $b'$, which tends to turn the spindle $b$ backward when it is free. Loose on the spindle $b$ is another ratchet-wheel, $b^3$, to which is fixed the indicating-hand H. There is also a volute spring, $b^4$, tending to make the wheel $b^3$ and its hand H recoil; but this recoil is prevented by a catch-pawl, $b^5$, engaging with the teeth of $b^3$. On the back of the wheel $b^3$ is a pin which is met by a stud, $b^6$, on the face of the wheel B, so that when B revolves in the direction of the arrow it carries $b^3$ with it, but B can recoil without $b^3$ recoiling also.

A lever, $c'$, acted on at stated intervals of time by the successive projections on the edge of the cam C, lifts the pawls $a^2$ and $a^4$ out of the teeth of B, whereupon B, urged by the spring $b'$, recoils till its stud $b^6$ comes against a fixed stop, and there it remains until the cam C in its revolution exposes a notch to the lever $c'$, whereupon the pawls $a^2$ $a^4$ again become engaged with the teeth of B, and the former moves it onward, as before. There is also a lever, $c^2$, (shown by dotted lines in Fig. 1,) which also, at stated intervals, being acted on by the studs $c$ of the cam C, releases the catch-pawl $b^5$, and permits the wheel $b^3$, urged by the spring $b^4$, to recoil, carrying the hand H back to zero of the dial, which is graduated to show the number of revolutions or strokes of the machine, or the distance traveled by the vehicle to which the apparatus is applied.

The reciprocation of $a$ keeps winding up the clock-work spring, and also advancing the wheel B, which causes the hand H to advance along the dial. This goes on for a certain time, which may be fifteen seconds, as determined by the speed and division of the cam C, when, by the action of the lever $c'$ on the pawls $a^2$ $a^4$, the wheel B is permitted to recoil; but the hand H remains in its advanced position, pointing to the mark on the dial representing the speed during the preceding interval of movement. When the hand has so remained, say, for fifteen seconds, one of the studs on C, acting on the lever $c^2$, releases the stop-pawl $b^5$, and permits the hand H to return to zero, whence it is again advanced during the stated interval to a graduation representing speed, remaining there for a time, and again recoiling, as before.

On the front glass of the dial, which is locked up, there is pivoted another balanced hand, $h$, with sufficient friction to prevent it from being moved by any shaking. This hand is moved by a pin, $h'$, on the hand H, and therefore accompanies H in its forward movement; but when H recoils the hand $h$ remains at the most advanced point which it has reached. This hand $h$ therefore indicates the maximum speed ever attained by the hand H, and remains pointing to that maximum speed until the official who possesses the key can unlock the front glass and set the maximum-hand back to zero for a fresh observation.

The pawl $a^3$ engages with the teeth of a ratchet-wheel, D, on the spindle of which there is a double cam or pair of wipers, $d$, acting on the arm of a hammer, $d'$, in opposition to a spring, $d^3$, which, when the lever is released by the wipers, causes the hammer to strike a bell, $d^2$. This striking of the bell, however, can only happen when the wheel D revolves—that is to say, when, besides the pawl $a^2$ for moving it, another pawl is engaged with it to prevent it from turning backward. This second pawl, which is a spring, $d^4$, (shown by dotted lines in Fig. 1,) is brought into action in the following manner: On the face of the wheel $b^3$ is a cam, $d^5$, which can be set round upon that wheel, and clamped by a couple of screws in any desired position. When the hand H attains a certain position in the dial the cam $d^5$, acting on a lever, $d^6$, throws the spring-pawl $d^4$ into gear with D, so as to prevent it from turning backward. The pawl $a^3$ then, continuing to turn D forward, causes the bell to be sounded, thus apprising the attendant that some particular speed to which the cam $d^5$ had been set is attained or exceeded.

For convenience of setting the cam $d^5$ a line marked on it is brought round to a fixed index, $d^7$, while the hand H is moved around to the graduation of the speed at which an alarm is desired to be given, and the cam $d^5$ is clamped in that position.

The pinion $b^2$ gears with a rack, P, which is guided to slide horizontally, and which travels to and fro, according as the wheel B advances or recoils. A tail-piece, $p$, projecting down from the rack P, moves to and fro with it a slide, $p'$, to which is jointed the pricking-point $p^2$, held up by a spring, $p^3$. Under this pricking-point a strip of paper, Q, passes from a reel, R, between rollers $r'$ $r^2$, pressed together by a spring acting on $r^2$.

A hammer-bar, T, has attached to it a spring connected by a rod, $t$, to a lever, $t'$, on which the studs $c$ of the cam C act successively. While one of these studs bears against the lever $t'$ the spring and hammer-bar are held up and the pricker $p^2$ travels across the paper strip a distance proportional to the number of divisions of the dial passed over by the hand H. Having attained its full distance, the stud $c$ releases $t'$, and thereupon the hammer-bar T descends, and, striking $p^2$, causes it to prick the paper below it. The hammer-bar T and pricker $p^2$ then recoiling upward, the pricker is clear of the paper, and returns with the rack to the zero-margin of the paper, ready to begin a fresh traverse after remaining for a time stationary. During this time the hammer-bar T, again being moved upward by the action of one of the studs $c$ on the lever $t'$, acts by a pawl on a ratchet-wheel on the axis of the roller $r'$, causing it to turn partly round, and so to advance the paper a certain distance before receiving its next prick-mark. Thus the distances of the prick-marks, measured lengthwise of the paper, are proportional to equal intervals of time, as determined by the successive actions of the studs $c$, while their distances, laterally measured from the right-hand margin of the papers, are proportional to the speeds during those intervals, as indicated by the hand on the dial. The pricked paper therefore constitutes a graphic record of the speeds throughout the time of working.

Having thus described the nature of my invention and the best means I know of putting it into practical operation, I claim, in an apparatus for indicating and recording speed—

1. The combination of the reciprocating lever $a$, its axis A, its arm and spring-pawls $a^2$ and $a^4$, roller $a'$, spring M, and spring-pawls $m$ and $m'$ with the ratchet-wheels B and $s$, for moving the speed indicating and registering gear and winding the clock-work thereof.

2. The combination of the cam-disk C and lever $c'$ with the pawls $a^2$ and $a^4$, the wheel B, and spring $b'$, for effecting the release and back movement of the wheel B at regular intervals of time.

3. The combination of the pins $c$ on the cam-disk C, the lever $c^2$, and pawl-stud $b^5$ with the ratchet-wheel $b^3$ and index H, the spring $b^4$, and the driver $b^6$ on the wheel B, for advancing the said index during regular intervals of time, retaining it in its advanced position during regular intervals, and causing its back movement.

4. The combination of the pawl $a^3$, ratchet-wheel D, cam $d$, hammer $d'$, and bell $d^2$ with the adjustable cam-disk $d^5$, lever $d^6$, and pawl $d^4$, for producing an audible alarm when a predetermined speed is attained.

5. The combination of the pinion $b^2$, rack P, sliding frame $p$, and pricker $p^2$, the reel R, paper strip Q, and rollers $r'$ and $r^2$ with the striking-bar T, rod $t$, lever $t'$, and pins $c$ on the disk C, for marking successive variations of speed on a moving strip of paper.

6. An apparatus for measuring speed, consisting of indicating and registering gear advanced step by step for each stroke or revolution of the engine, machine-shaft, or vehicle-axle during a certain interval of time, in combination with time mechanism for causing the index to recoil to the starting-point after it has effected the registration of the speed, substantially as described, and for the purposes set forth.

FRIEDRICH PETRI.

Witnesses:
T. J. PICKETT,
W. E. DUCKETT.